Patented Oct. 6, 1953

2,654,735

UNITED STATES PATENT OFFICE 2,654,735

PROCESS FOR THE PRODUCTION OF DERIVATIVES OF 9-POLYHYDROXYALKYL-ISOALLOXAZINES AND PRODUCTS OBTAINED

Casimir Funk, New York, and A Jay Merritt, Elmont, N. Y., assignors to U. S. Vitamin Corporation, New York, N. Y., a corporation of Delaware No Drawing. Application July 29, 1949,
Serial No. 107,628

13 Claims. (Cl. 260—211.3)

The invention relates to acid esters of 9-polyhydroxyalkyl-isoalloxazines and salts thereof, and to a method for their preparation. More particularly, it pertains to the preparation of derivatives of 9-polyhydroxyalkyl-isoalloxazines of increased water-solubility and includes correlated improvements and discoveries whereby such derivatives may be produced with the obtention of substances of enhanced value.

It will be understood that mention particularly of riboflavin throughout the specification is by way of illustration only and not limitative. Riboflavin is one of the factors of the B-complex and is known to be the least soluble of this water-soluble series of vitamins. Further, it is recognized that the therapeutic use of riboflavin in solution is decidedly restricted because of its low solubility in solvents which may be physiologically utilized, e. g., water, aqueous ethyl alcohol, glycerol and the like.

Much work has been done seeking to increase the solubility of riboflavin either through the production of derivatives thereof containing solubilizing groups, or through the employment of solubilizers for the riboflavin. Inasmuch as the solubility of riboflavin in water is slight, the administration thereof hypodermically requires a large volume of liquid. Riboflavin at 20° C. has a solubility in pure water of about 0.013% and hence the administration of a 10 milligram dose of riboflavin at 20° C. would require the injection of about 78 cc. of solution. Further, the solubility of riboflavin in organic solvents as glycerol, alcohol and the like is even more limited and this impedes the preparation of concentrated multi-vitamin liquid products in desired proportions. Moreover, the slight solubility of riboflavin has made it impossible to obtain a sufficiently high dosage in conjunction with more soluble vitamins in a volume suitable for use, so that if a greater volume were employed in order to provide a proper dosage for riboflavin, then higher dosages of the more soluble vitamins would result.

Furthermore, riboflavin may be administered as a solid in the form of tablets or capsules, but as it is sometimes desirable to administer it parenterally or in solution for oral use, the riboflavin must be rendered more soluble and sufficiently so that a therapeutically effective amount may be present in a reasonable amount of water or other inert or innocuous solvent.

An object of the present invention is to provide a process for the production of derivatives of a 9-polyhydroxyalkyl-isoalloxazine, and especially of riboflavin, that are of relatively high solubility, particularly in water.

Another object of the invention is the provision of a process in accordance with which derivatives of a 9-polyhydroxyalkyl-isoalloxazine of increased water-solubility may be produced by reaction with a phosphorus-containing substance, and a water-soluble vitamin whereby acid esters of a 9-polyhydroxyalkyl-isoalloxazine with a water-soluble vitamin are obtained. Also, salts of such acid esters which are even more readily soluble and more stable than the acid esters may be prepared.

An additional object of the invention is the provision of a process for the preparation of riboflavin derivatives which are distinctly more soluble in water and other harmless solvents than the unreacted riboflavin.

A still further object of the invention is the provision of a composition of matter which is a derivative of a 9-polyhydroxyalkyl-isoalloxazine and formed by the reaction between a 9-polyhydroxyalkyl-isoalloxazine, a compound selected from the group consisting of water-soluble vitamins and lower aliphatic amino acids and hydrated phosphorus oxychloride.

A more particular object of the invention is the provision as a composition of matter of a derivative of riboflavin formed by reaction between riboflavin, a water-soluble vitamin and a hydrated reactive phosphorus composition capable of forming phosphorus acid esters.

A specific object of the invention is to provide as a composition of matter a derivative of riboflavin formed by reaction between riboflavin, a nicotinic acid compound and phosphorus oxychloride, or hydrated phosphorus oxychloride.

Other objects of the invention will in part be obvious and will in part appear hereinafter.

The invention accordingly comprises the several steps, and the relation of one or more of such steps with respect to each of the others, and the compositions possessing the features, properties and the relation of constituents which are exemplified in the following detailed disclosure, and the scope of the invention will be indicated in the claims.

In the practice of the invention, derivatives of a 9-polyhydroxyalkyl-isoalloxazine may be produced by a process which comprises reacting a mixture containing a 9-polyhydroxyalkyl-isoalloxazine, and more particularly 6,7-dimethyl-9-d-ribityl-isoalloxazine (riboflavin) and 6,7-dimethyl-9-1-arabityl-isoalloxazine (araboflavin), a nicotinic compound selected from the group consisting of nicotinic acid (niacin), nicotinamide (niacinamide), and a salt of nicotinic acid, as the calcium, sodium or potassium salts thereof, and phosphorus oxychloride in hydrated form. Referring hereinafter to riboflavin as illustrative of the 9-polyhydroxyalkylisoalloxazines and not by way of limitation, the reaction mixture may contain riboflavin, a nicotinic acid compound and hydrated phosphorus oxychloride. As pointed out above, the nicotinic compound may be nicotinic acid (niacin), nicotinamide (niacinamide) or a salt of nicotinic acid as the calcium, sodium and potassium salts. Furthermore, other water-soluble vitamins as ascorbic acid and pyridoxine may be employed, and lower aliphatic amino acids as glycine, alanine, beta-alanine and esters thereof may be utilized.

The proportions in which the various reactants may be employed may vary, with satisfactory results having been obtained with the following relative proportions: 1 mole of riboflavin, 1 mole of a nicotinic compound, as nicotinic acid or nicotinamide, and 15 moles of hydrated phosphorus oxychloride. These proportions lead to the production of riboflavin derivatives which are markedly more soluble in water and other harmless solvents than is the unreacted riboflavin.

As an illustrative embodiment of a manner in which the invention may be practiced, the following examples are presented. The parts are by weight.

EXAMPLE 1

15.04 parts riboflavin.
4.88 parts niacinamide.
70.00 parts hydrated phosphorus oxychloride.

In a suitable receptacle as a glass mortar of sufficient size grind the riboflavin and niacinamide until they are intimately mixed. Add the hydrated phosphorus oxychloride and mix intermittently over a period of about 48 hours. Add 150 parts of cracked ice, stirring until all the ice has melted, then transfer to a vessel desirably of pyrex glass for crystallization, washing the receptacle or mortar with two 10 cc. portions of water. Allow to crystallize overnight at about 10° C. Filter by suction, removing as much of the mother liquor as possible; wash the product twice with 100 ml. portions of anhydrous ethyl alcohol; then wash twice with 100 ml. portions of ethyl ether, and dry in vacuo.

The yield was 15.0 parts dry material which is 67% of theoretical. Hence, the theoretical riboflavin content is 67.0%, and that found equals 66.2% (fluorometric analysis). Microanalysis of the product after recrystallization gave the following results:

| Theoretical | Analysis, percent | Percent/At. Wt. | Ratio |
|---|---|---|---|
| 4.67 | H: {4.64, 4.82} 4.73 | 4.73 | 26.8 |
| 47.80 | C: {48.78, 48.99} 48.88 | 4.07 | 23.0 |
| 14.53 | N: {14.55, 14.79} 14.67 | 1.049 | 5.95 |
| 5.37 | P: {5.33, 5.61} 5.47 | 0.176 | 1 |
|  | 73.75 |  |  |
| Empirical Formula is $C_{23}H_{27}N_6PO_{10}$ | | | |
| 27.63 | O 26.25 | 1.64 | 9.3 |

This empirical formula indicates that the product contains 1 mole of riboflavin and 1 mole of niacinamide, esterified with 1 mole of phosphoric acid, i. e., contains a phosphoric acid group. The hydrated phosphorus oxychloride used in the reaction may be prepared by slowly hydrating phosphorus oxychloride with 2 moles of water under mixing and cooling. For example, to 151.5 grams of phosphorus oxychloride (1 mole) are added 36 grams (2 moles) of water in a suitable glass vessel, dropping the water in slowly over a period of about two days with agitation at a temperature of about 0° C. The mixture is then stirred intermittently for a period of about two weeks until the mix becomes viscous and most of the hydrochloric acid which is formed in the reaction has been removed. Best results were obtained when the hydrated phosphorus oxychloride was used in this viscous form, i. e., when it is at least two weeks old. The amount of hydrated phosphorus oxychloride used in the reaction represents approximately 15 molecular equivalents but this amount may be varied, e. g., by ±20%.

The reaction, it will be realized, may be carried out in a suitable vessel, with mechanical agitation; means for removing the hydrochloric acid gas formed in the reaction, and means for cooling the reaction mixture. Further, the reaction may also be carried out so that the final product may be obtained in a period of less than 48 hours. In order to obtain a purified product free from excessive amounts of tarry by-products it is important that the reaction between a hydroxy group of the riboflavin and the phosphoric acid be slowed somewhat. It is believed that the reaction products are esters of the vitamins and phosphoric acid, and while the structure of the composition has not been definitely established, nevertheless it is thought to be as follows:

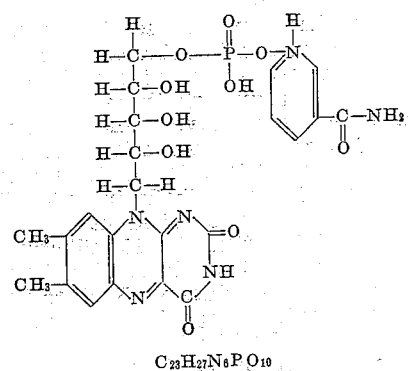

$C_{23}H_{27}N_6PO_{10}$

EXAMPLE 2

15.04 parts riboflavin.
4.88 parts niacinamide.
70.00 parts hydrated phosphorus oxychloride (at least two weeks old).

In a suitable receptacle or vessel, as a glass mortar grind the riboflavin and niacinamide until they are intimately mixed. Add the hydrated phosphorus oxychloride and mix intermittently over a period of about 48 hours. Add 150 parts of cracked ice, stirring until all the ice has melted. The reaction mixture is now treated with 28% ammonia water until a pH of about 5.5 is obtained. The mixture is then shaken or agitated with an adsorbing powder such as a Norite charcoal for 15 to 20 minutes, using about 7 to 10 parts of the charcoal per part of riboflavin. The charcoal or other adsorbate is filtered off and washed, e. g., in a soxhlet apparatus, with water until free of chloride and phosphate ions.

Elution of the product from the charcoal adsorbate is carried out by an azeotropic mixture of pyridine (57%) and water (43%). When the elution is complete, the eluate is evaporated to dryness. The residue is dissolved in a minimum amount of boiling water and hot ethyl alcohol is added until beginning of crystallization. The mixture is then cooled and allowed to stand in a cooled space for a period, as overnight, for crystallization. The crystalline product is filtered, washed with anhydrous alcohol and ether and dried in a vacuum chamber. The yield was 3.4 parts of a crystalline powder. Additional recovery can be obtained by further evaporation of the mother liquors.

EXAMPLE 3

*Preparation of the ammonium salt of the soluble riboflavin compound*

To prepare the ammonium salt of the soluble riboflavin compound, the free acid prepared as in Example 1 is mixed with water, 10 ml. of water per gram of the riboflavin compound, and the pH brought to 6.5–7.0 with 28% ammonia water. Insoluble material, if any, is removed, and anhydrous ethyl alcohol is added in an amount to give an alcohol concentration of 30%. The mixture is then placed in a cool space overnight and the ammonium salt crystallizes. The salt is separated by filtration, washed with ethyl alcohol, then with ether, and dried in vacuo. Additional ethyl alcohol in an amount to give an alcohol concentration of 50% is added to the mother liquor and a further amount of the ammonium salt crystallizes in the cold. After separation of these crystals, alcohol to give a concentration of 80% is added to the mother liquor and a third formation of crystals is obtained.

Starting with 4.0 grams of the riboflavin compound, described in Example 1, a total of 3.4 grams of the ammonium salt is obtained. This compound is soluble in water to the extent of about 50 mgms. per cc.

The foregoing procedures yield derivatives of riboflavin which are characterized by markedly increased solubility in water in comparison with riboflavin, such that by way of example solutions may be prepared containing from 12–13 milligrams per milliliter of solution. Further, the products as the derivatives of riboflavin may be looked upon somewhat as substances containing 1 mole of riboflavin, 1 mole of a nicotinic compound, as nicotinic acid, nicotinamide, and a salt of nicotinic acid, and a phosphoric acid group. Additionally, the derivatives have an average content of phosphorus from about 5% to about 6%.

While the amounts of the reactants and the conditions under which the derivatives are formed desirably are those given in the foregoing examples, nevertheless, the amounts and the conditions may be varied somewhat, and such variations lead to the preparation of products of different solubilities. As set forth hereinbefore, water-soluble vitamins may be utilized as reactants, more particularly, nicotinic acid, nicotinamide, salts of nicotinic acid and ascorbic acid, and also that lower molecular weight saturated aliphatic amino acids as glycine may be employed in place of the water-soluble vitamins. The products thus obtained possess the property of increased water-solubility, stability in solution and distinctive riboflavin activity as determined micro-biologically and fluorometrically.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the production of derivatives of a 9-polyhydroxyalkyl-isoalloxazine which comprises reacting a mixture containing a 9-polyhydroxyalkyl-isoalloxazine, a nicotinic compound selected from the group consisting of nicotinamide, nicotinic acid and the calcium, sodium and potassium salts thereof, and hydrated phosphorus oxychloride.

2. A process for the production of derivatives of a 9-polyhydroxyalkyl-isoalloxazine which comprises reacting a mixture containing a 9-polyhydroxyalkyl-isoalloxazine, a nicotinic compound selected from the group consisting of nicotinamide, nicotinic acid and the calcium, sodium and potassium salts thereof, and hydrated phosphorus oxychloride at a temperature at least as low as 10° C.

3. A process for the production of derivatives of a 9-polyhydroxyalkyl-isoalloxazine which comprises reacting a mixture containing a 9-polyhydroxyalkyl-isoalloxazine, nicotinamide and hydrated phosphorus oxychloride riboflavin, a nicotinic compound selected from the group consisting of nicotinamide, nicotinic acid and the calcium, sodium and potassium salts.

4. A process for the production of derivatives of riboflavin which comprises reacting a mixture containing riboflavin, a nicotinic compound selected from the group consisting of nicotinamide, nicotinic acid and the calcium, sodium and potassium salts thereof, and hydrated phosphorus oxychloride at a temperature as low as 10° C.

5. A process for the production of derivatives of riboflavin which comprises reacting a mixture containing riboflavin, a nicotinic compound selected from the group consisting of nicotinamide, nicotinic acid and the calcium, sodium and potassium salts thereof, and hydrated phosphorus.

6. A process for the production of derivatives of riboflavin which comprises reacting a mixture containing riboflavin, nicotinamide, and hydrated phosphorus oxychloride, in the respective approximate molar ratio of 1:1:15.

7. A process for the production of derivatives of riboflavin which comprises reacting a mixture containing riboflavin, nicotinamide, and hydrated phosphorus oxychloride at a temperature at least as low as 10° C., in the respective approximate molar ratio of 1:1:15.

8. As a composition of matter a 9-polyhydroxyalkyl-isoalloxazine derivative comprising the reaction product of a 9-polyhydroxyalkyl-isoalloxazine, a nicotinic compound selected from the group consisting of nicotinamide, nicotinic acid and the calcium, sodium and potassium salts thereof, and hydrated phosphorus oxychloride, and having an average phosphorus content from about 5% to about 6% and a water-solubility greater than that of the unreacted 9-polyhydroxyalkyl-isoalloxazine.

9. As a composition of matter a riboflavin derivative comprising the reaction product of riboflavin, a nicotinic compound selected from the group consisting of nicotinamide, nicotinic acid and the calcium, sodium and potassium salts thereof, and hydrated phosphorus oxychloride, and having an average phosphorus content from about 5% to about 6% and a water-solubility greater than that of the unreacted riboflavin.

10. As a composition of matter a riboflavin derivative comprising the reaction product of riboflavin and nicotinamide in essentially equimolar proportion and hydrated phosphorus oxychloride, said derivative having an average phosphorus content from about 5% to about 6% and a water-solubility greater than that of riboflavin.

11. A composition of matter as defined in claim 8 in the form of an ammonium salt.

12. A composition of matter as defined in claim 9 in the form of an ammonium salt.

13. A composition of matter as defined in claim 10 in the form of an ammonium salt.

CASIMIR FUNK.
A JAY MERRITT.

References Cited in the file of this patent

UNITED STATES PATENTS

| Number | Name | Date |
|---|---|---|
| 2,111,491 | Kuhn et al. | Mar. 15, 1938 |
| 2,256,604 | Auhagen | Sept. 23, 1941 |
| 2,407,412 | Frost | Sept. 10, 1946 |
| 2,449,041 | Upham | Sept. 7, 1948 |
| 2,480,517 | Stecher | Aug. 30, 1949 |

OTHER REFERENCES

Meerwein et al., Chem. Abst., vol. 24 (1930), page 1049.

Booher, Chem. and Ind., September 19, 1942, page 390.

Gerrard et al., Chem. Abst., vol. 39 (1945), page 2734.